Figure 1:
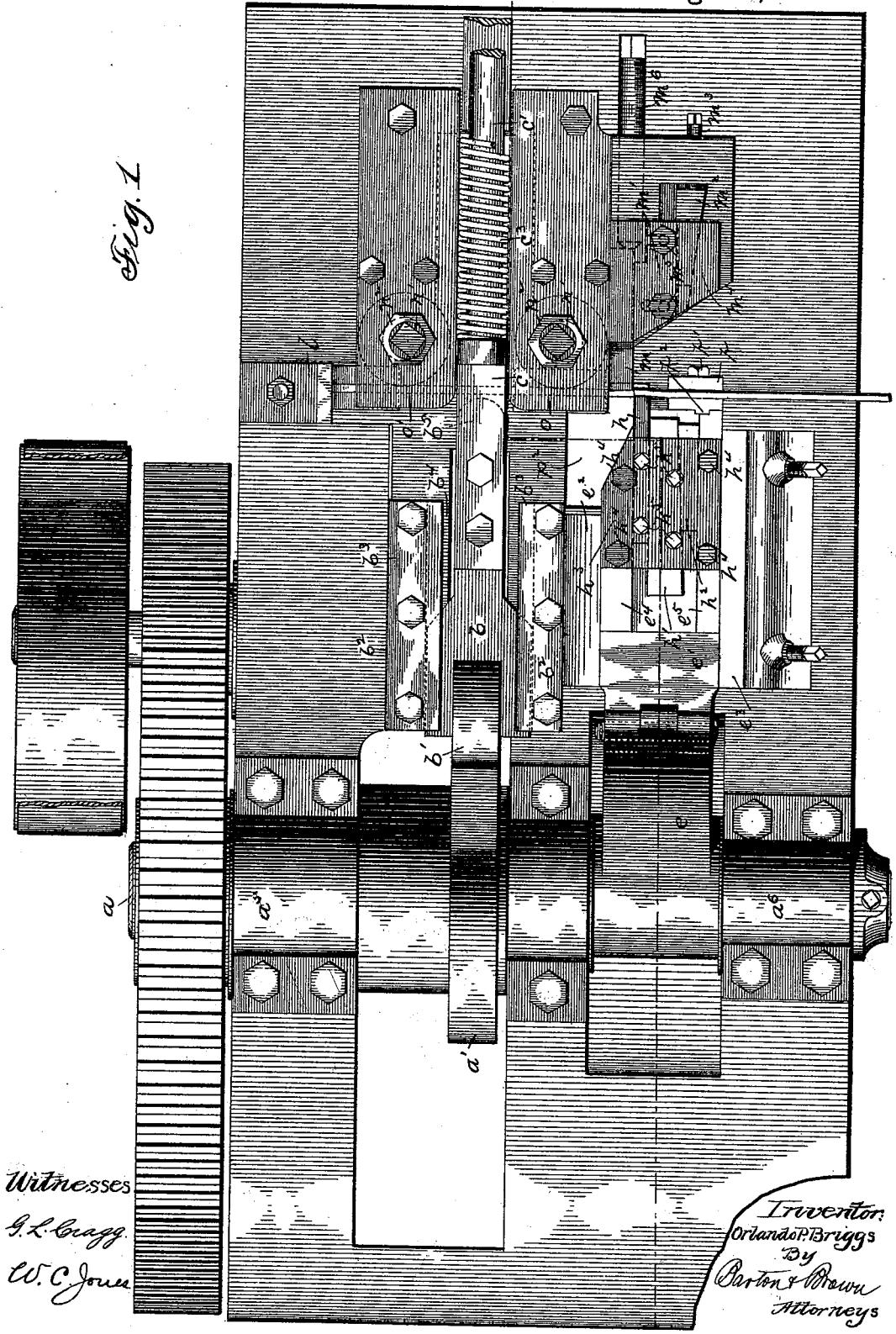

(No Model.)　　　　　　　　　　　　　　6 Sheets—Sheet 1.
O. P. BRIGGS.
MAGNET FORMING MACHINE.

No. 544,343.　　　　　　　Patented Aug. 13, 1895.

Witnesses
G. L. Cragg
W. C. Jones

Inventor:
Orlando P. Briggs
By
Barton & Brown
Attorneys (No Model.) 6 Sheets—Sheet 3.

O. P. BRIGGS.
MAGNET FORMING MACHINE.

No. 544,343. Patented Aug. 13, 1895.

Witnesses:
George L. Cragg
W. Clyde Jones

Inventor:
Orlando P. Briggs
By Barton & Brown
Attorneys (No Model.) 6 Sheets—Sheet 5.

O. P. BRIGGS.
MAGNET FORMING MACHINE.

No. 544,343. Patented Aug. 13, 1895.

Witnesses
G. L. Cragg.
W. C. Jones.

Inventor
Orlando P. Briggs
By Barton & Brown
Attorneys (No Model.) 6 Sheets—Sheet 6.
O. P. BRIGGS.
MAGNET FORMING MACHINE.
No. 544,343. Patented Aug. 13, 1895.
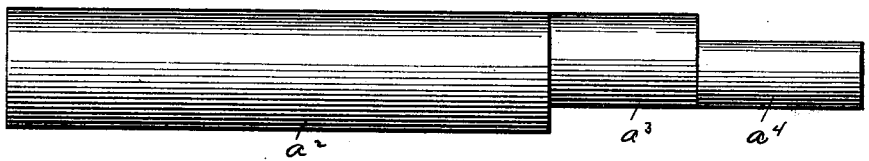
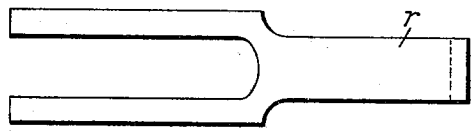
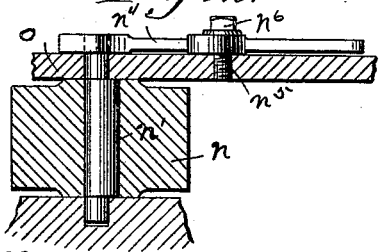
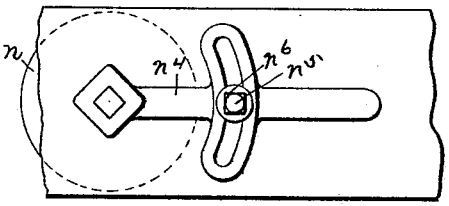
Witnesses
George S. Brull.
W. Clyde Jones.
Inventor
Orlando P. Briggs.
By Barton & Brown Atty's.

UNITED STATES PATENT OFFICE.

ORLANDO P. BRIGGS, OF CHICAGO, ILLINOIS, ASSIGNOR TO THE WESTERN ELECTRIC COMPANY, OF SAME PLACE.

MAGNET-FORMING MACHINE.

SPECIFICATION forming part of Letters Patent No. 544,343, dated August 13, 1895.

Application filed January 20, 1894. Serial No. 497,547. (No model.)

*To all whom it may concern:*

Be it known that I, ORLANDO P. BRIGGS, a citizen of the United States, residing at Chicago, in the county of Cook and State of Illinois, have invented a certain new and useful Improvement in Magnet-Forming Machines, (Case No. 7,) of which the following is a full, clear, concise, and exact description, reference being had to the accompanying drawings, forming a part of this specification.

My invention relates to a magnet-forming machine, and its object is to greatly reduce the cost of bending magnet-bars by the provision of means for automatically cutting from a bar fed to the machine the proper length of material and bending the same into the desired shape.

My invention comprises a machine embodying a reciprocating cutter adapted to cut from a bar fed to the machine the proper length of material and a reciprocating plunger adapted to engage the severed length and pass the same between a pair of rollers, the plunger and rollers co-operating to bend the bar into the desired U shape.

The machine of my invention in its preferred embodiment comprises a driven shaft carrying an eccentric strap and rod to impart a reciprocating movement to a slide traveling in guideways. Mounted upon the slide is a cutting-off tool, which co-operates with a stationary cutting-off tool to shear from a bar fed to the machine a length of material, which, when properly bent, will form the magnet. The portion of the bar thus sheared from the stock occupies a position in the path of a plunger carried upon a reciprocating cross-head, sliding between guides and carrying upon its end a roller adapted to be engaged by a cam mounted upon the main shaft to periodically advance the cross-head and cause the plunger carried thereon to engage the middle portion of the severed portion of the bar and advance the same between a pair of rollers, which bend the bar and cause it to lie against the sides of the plunger, which have a contour corresponding to the desired shape of the completed magnet. The rollers are preferably mounted eccentrically, so that the distance between the peripheries of the rollers and the surface of the plunger may be adjusted.

My invention will be readily understood by reference to the accompanying drawings, in which—

Figure 2:
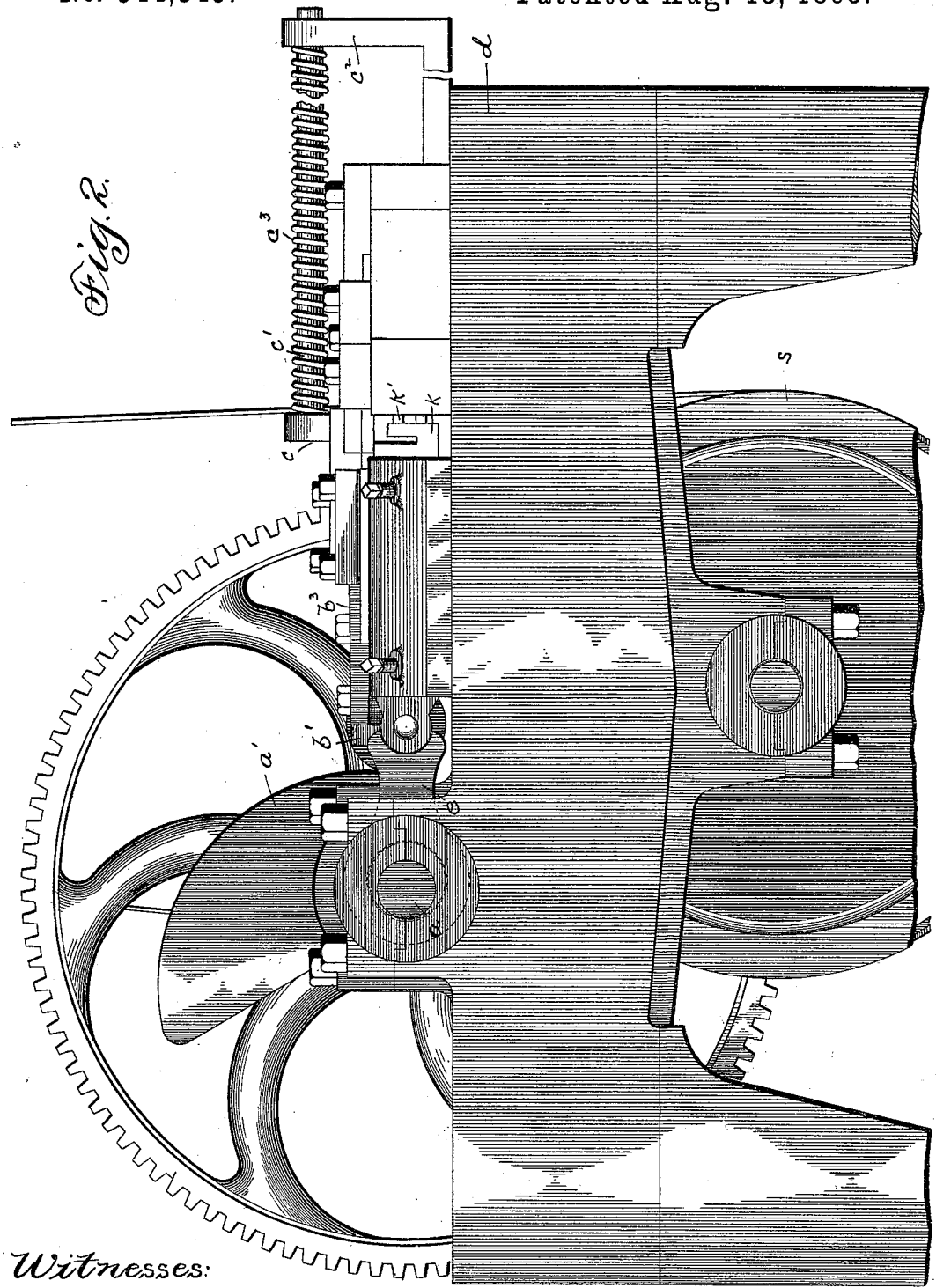
Figure 3:
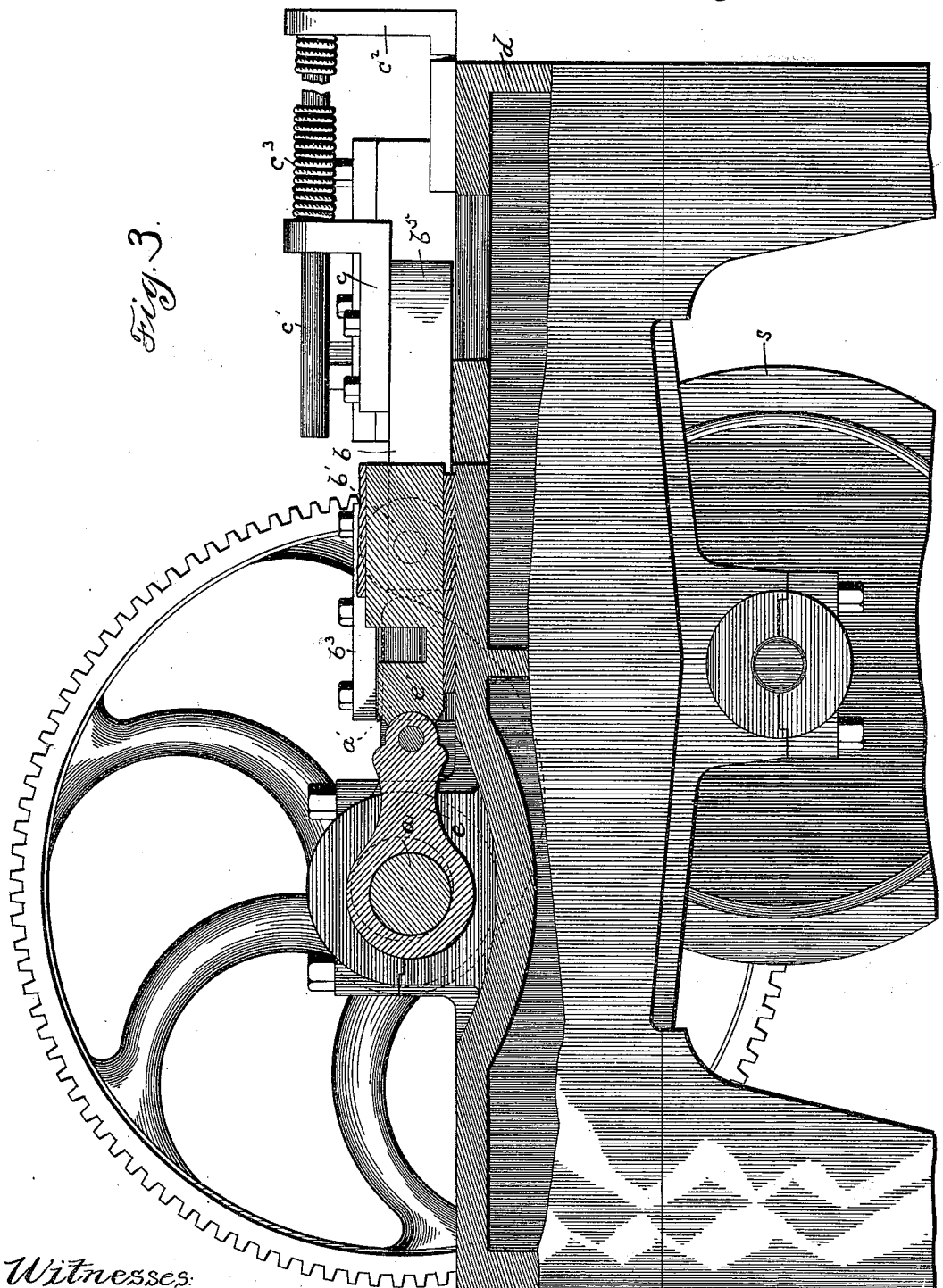
Figure 4:
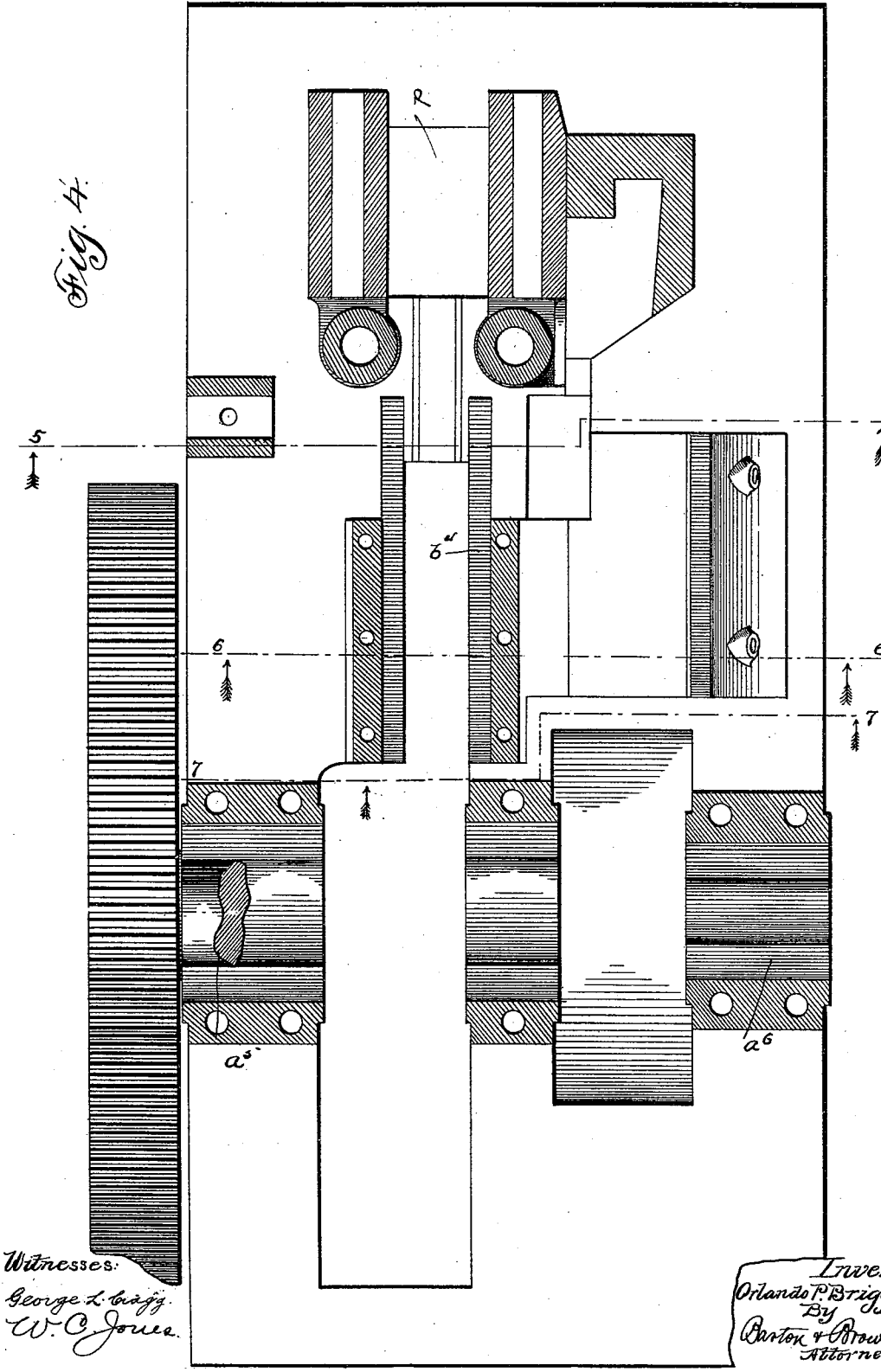
Figure 5:
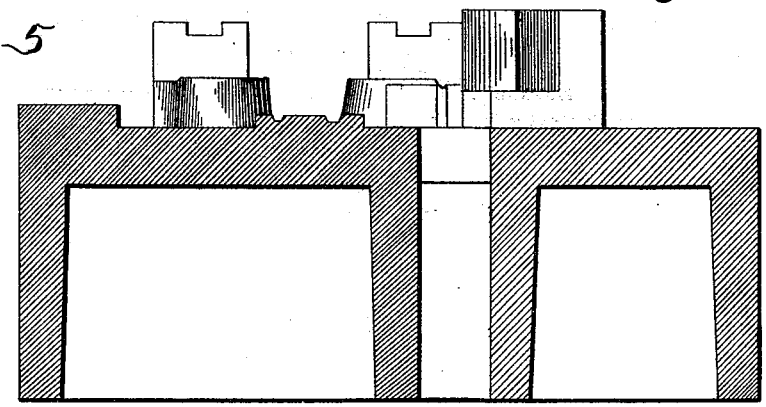
Figure 6:
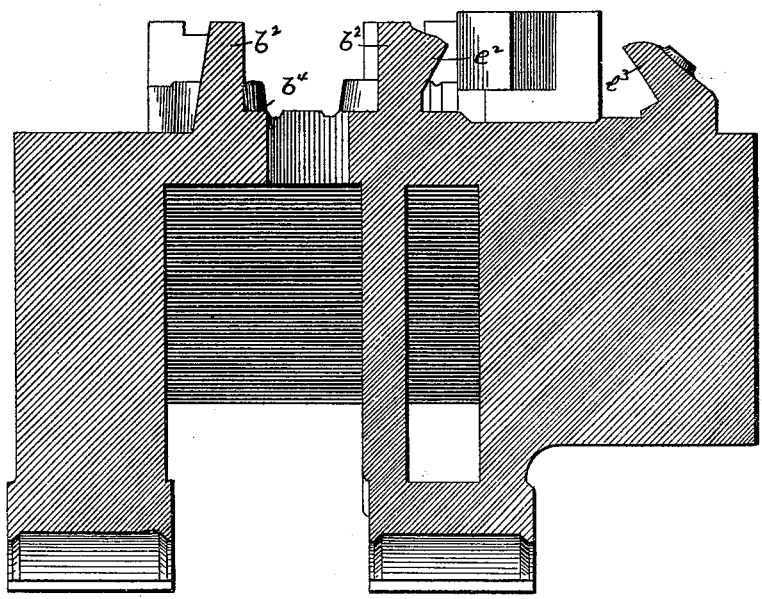
Figure 7:
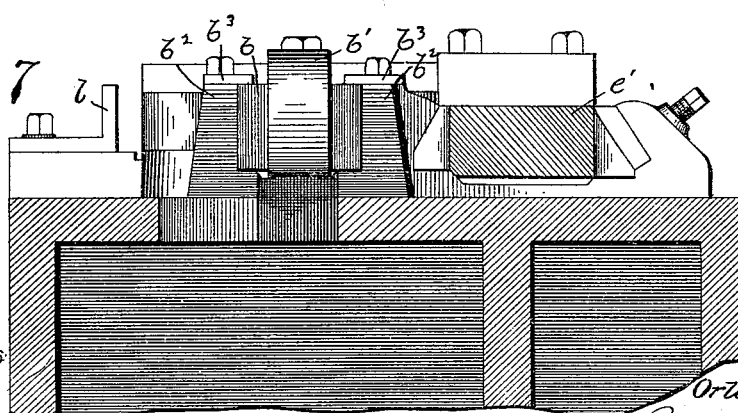

Figure 1 is a plan view of a machine embodying my invention. Fig. 2 is an elevational view thereof. Fig. 3 is an elevational view, partially in section, showing the slide that carries the cutting-off tool with its eccentric connection with the driving-shaft. Fig. 4 is a plan view of the bed-plate of the machine. Fig. 5 is a sectional view of the bed-plate on line 5 5, Fig. 4. Fig. 6 is a sectional view of the bed-plate on line 6 6, Fig. 4. Fig. 7 is a sectional view on line 7 7, Fig. 4, the slide carrying the cutting-off tool and the reciprocating cross-head being shown in place. Fig. 8 is a detail view of the main shaft. Fig. 9 is a detail view of the plunger, showing its surface recessed upon the end for the reception of the magnet during bending, one of the rollers, also recessed, being shown, the wedge for raising and lowering the end of the plunger to maintain it in alignment with the roller being illustrated. Fig. 10 is a plan view of the wedge, its middle portion being cut away to permit the travel of the cam-roller. Fig. 11 is a detail view of the plunger, showing its surface recessed upon the end and sides. Fig. 12 is a detail view of one of the rollers and its eccentric mounting, a preferred device for maintaining the journal in an adjusted position being shown. Fig. 13 is a plan view of the device for maintaining the journal in its adjusted position.

Like letters refer to like parts throughout the several figures.

The main shaft $a$ carries a cam $a'$ which engages with the roller $b'$, mounted upon the end of the cross-head $b$, said cross-head being adapted to travel back and forth between guides $b^2$ $b^2$, a pair of plates $b^3$ $b^3$ being secured by bolts to the tops of the upright guides $b^2$ $b^2$ to prevent the cross-head from leaving its seat $b^4$. The cross-head $b$ is formed at its forward end into a plunger $b^5$, having a U-shaped contour. To the top of the cross-head is secured by means of bolts a plate $c$, carrying a vertical extension provided with a hole adapted to receive a bar $c'$, the end thereof being secured to a bracket $c^2$, mounted upon the bed-plate $d$ of the machine. Between the bracket $c^2$ and the extension of the plate $c$ is located a coiled spring $c^3$, which is placed under tension during the advance of the plunger, the cam $a'$ during this advance acting upon the roller $b'$ to move the plunger forward. When the cam releases the roller the spring $c^3$ reacts to return the plunger to its former position.

As shown in Fig. 8, the main shaft comprises three portions $a^2$, $a^3$, and $a^4$, the portions $a^2$ and $a^4$ being concentric, though of different diameters, while the intermediate portion $a^3$ is eccentric to the other portions. The concentric portions $a^2$ and $a^4$ are mounted in the bearings $a^5 a^6$, the portion $a^2$ carrying the cam $a'$ keyed thereto. As shown more clearly in Fig. 3, the end of the connecting-rod $e$ embraces the eccentric portion of the shaft, the end of the connecting-rod being journaled to the reciprocating slide $e'$ by means of a knuckle-joint. The slide $e'$ travels between the guides $e^2$ $e^3$, which may be made oblique to prevent the slide from leaving its seat. The slide $e'$ is provided upon its upper surface with elevations $e^4$ $e^5$ at the side and an intermediate recessed portion, the cutting-off tool $h$ resting against the wall of the elevation $e^4$, a block $h'$ with a tapering side being placed between the tool and the tapering key $h^2$, which when driven between the block $h'$ and the wall of the elevation $e^5$ clamps the cutting-off tool in position. A plate $h^3$ rests upon the elevations $e^4$ $e^5$, being screwed thereto by bolts $h^4$ $h^4$, while bolts $h^5$ $h^5$ pass through said plate and engage the tool and block $h'$ to prevent the same from slipping. Upon the forward end of the slide $e'$ is secured the support $k$, carrying a channel through which the bar is passed from which the magnets are formed, the bar being advanced through said support until its end comes in contact with the limiting-stop $l$. The support $k$ is bolted against the end of the slide $e'$ by a single bolt $k'$, and in order to prevent its turning about the bolt as an axis a vertical channel is cut in the end of the guide, into which fits a vertical tongue $k^2$, provided upon said support. Upon the advance of the slide $e'$ the bar is carried forward against the tool $m$, the tools $h$ and $m$ coacting to shear the metal of the bar. The end of the bar from which the magnets are formed is usually not square, and a short piece of the end is removed before cutting off the length for the first magnet. An opening $p^2$ is provided in the bed-plate of the machine through which the ends thus cut off may fall.

The tool $m$ is held in position by the spacing-block $m'$, which is pressed against the side of the tool by the key $m^2$, which is moved longitudinally by the screw $m^3$. A plate $m^4$ resting upon the tool is clamped down upon the same by means of bolts $m^5$ $m^5$, thus securely maintaining the tool in position. A screw $m^6$ engages by its end the end of the tool $m$, means being thus afforded for the adjustment of the tool and for taking up the thrust thereon.

As shown more clearly in Figs. 1 and 12, the journals $n'$ $n'$, upon which the rollers $n$ $n$ are mounted, are eccentric at the ends where they bear in the supporting-plates, the upper ends of the journals being threaded and nuts $n^2$ $n^2$ screwing upon said ends and against the plates $o$ $o'$ to prevent the turning of said journals. When it is desired to adjust the distance between the peripheries of the rollers the nuts $n^2$ $n^2$ are loosened and the journals $n'$ $n'$ are slightly turned. The portions of the journals upon which the rollers are mounted being eccentric to those portions bearing in the supporting-plates, the distance between the rollers may be thus adjusted by turning, after which the nuts $n^2$ $n^2$ may be screwed home to lock the journals in position.

Although, in some cases, the construction above described serves to maintain the roller-journals in their adjusted positions, I preferably employ the device illustrated in Figs. 12 and 13. The upper end of the journal is made square, and over this fits a bar $n^4$, provided with a handle, by means of which the journal may be turned, the bar also carrying an arc-shaped slot, through which passes a bolt $n^5$, by means of which the bar $n^4$ may be clamped in any position by screwing down the nut $n^6$, thus maintaining the journal fixedly in any position of adjustment.

An opening $p$ is provided in the bed-plate of the machine, through which the magnet falls after having been bent about the plunger. In order to insure the proper bending of the bar the plunger may be provided with a recess in its surface, as shown in Fig. 11, in which the bar is adapted to fit as it is bent about the plunger. When the recessed plunger is employed there is no danger of the bar bending with a wind, as may sometimes happen when the plunger is smooth; or a recess may be provided in the end only of the plunger, while the rollers are recessed, as shown in Fig. 9. In this case it is desirable to provide means for raising and lowering the end of the plunger to maintain the recesses on the plunger and the rollers in alignment. Such means may comprise a tapering seat or wedge $r$, with its middle portion cut away to accommodate the cam-roller $b'$, the wedge being placed beneath the end of the plunger and serving as its seat, and being adjustable back and forth by means of a screw $r'$ to raise and lower the end of the plunger. When the plunger is recessed the portion below the recess may project beyond the upper portion, as shown in Figs. 9 and 11, and the bar from which the magnet is to be formed may be placed directly upon this portion in feeding the machine.

I will now describe briefly the operation of a machine as above constructed. The bar from which the magnets are to be formed is fed through the support $k$, and at a time when the cutting-off tool and the plunger are near the ends of their backward strokes the bar is thrust forward until the end thereof comes in contact with the limiting-stop $l$. Upon the forward stroke of the cutting-off tool the portion of the bar between the cutting-off tool and the limiting-stop is severed from the remaining portion, and shortly thereafter the advancing plunger $b^5$ engages the middle portion of the bar and passes it between the rollers $n\ n$, which bend the bar, pressing the same against the surface of the plunger and imparting to it a U-shaped form. When the plunger has advanced so far that the rollers $n\ n$ no longer engage the bar, the formed magnet drops through the opening $p$ in the bedplate and the plunger makes its return stroke through the reaction of the spring $c^3$, and the operation is repeated.

When the recessed plunger is employed, the formed bar does not fall from the plunger as soon as engagement with the rollers ceases, but upon the return stroke of the plunger the ends of the formed magnet coming against the rollers the plunger is withdrawn from the magnet and the magnet drops through the opening $p$.

A fly-wheel $s$ is provided in connection with the machine, in which energy may be stored in the form of inertia during the intervals between the bending operations, the fly-wheel yielding up its energy during the bending process to assist the driving-motor.

Having described my invention, what I claim as new, and desire to secure by Letters Patent, is—

1. In a magnet forming machine, the combination with a reciprocating cross-head carrying a cutting-off tool, of a stationary cutting-off tool adapted to coact therewith to sever from a bar fed to the machine material of the proper length for the magnet to be formed, a reciprocating plunger situated by the side of the cross-head, and a pair of rollers between which said plunger is adapted to pass to bend the material cut from the bar about the end of the plunger to form the magnet, substantially as described.

2. In a magnet forming machine, the combination with the main shaft comprising the concentric portions $a^2$, $a^4$, and the intermediate eccentric portion $a^3$, of the cam $a'$ mounted upon the concentric portion $a^2$, and adapted to reciprocate the plunger $b^5$, and the eccentric strap $e$ mounted upon the eccentric portion $a^3$ and adapted to reciprocate the slide $e'$, substantially as described.

3. In a magnet forming machine, the combination with a reciprocating plunger, of a pair of rollers located one upon each side of said plunger, the journals of said rollers being eccentrically mounted in bearings, whereby the distance between the peripheries of said rollers may be adjusted, substantially as described.

4. In a magnet forming machine, the combination with a reciprocating cross-head, of a support for the bar from which the magnets are to be formed mounted upon said cross-head, a cutting-off tool provided upon said cross-head, and a stationary cutting-off tool adapted to coact therewith, a plunger adapted to engage the portion of the bar cut off by said cutting-off tools, and a pair of rollers between which said plunger is adapted to be passed to bend the material about the plunger, substantially as described.

5. In a magnet-forming machine, the combination with a pair of rollers, of a plunger adapted to be passed between the peripheries of said rollers to bend the bar from which the magnet is to be formed about the end and sides of said plunger, a channel or recess being provided in the surface of said plunger in the plane of travel of the plunger and having a width corresponding to the width of the bar, the bar being adapted to fit snugly in said recess to prevent the bending of the bar with a wind, substantially as described.

6. In a magnet forming machine, the combination with a pair of rollers, of a plunger adapted to be passed between said rollers to bend the bar from which the magnet is to be formed about the end and sides of the plunger, a channel or recess being provided in the surface of the plunger in which said bar is adapted to fit as the same is bent about the plunger, said rollers being each provided with a peripheral channel or recess situated opposite the recess in the plunger and adapted to receive the bar, and means for relatively adjusting said plunger and rollers to maintain said recesses at the proper height, substantially as described.

7. In a magnet forming machine, the combination with the plunger $b^5$ provided in its surface with a recess or channel in which the bar to be bent is adapted to fit, of the rollers $n\ n$ situated one on each side of said plunger and provided with peripheral channels situated opposite the channel in said plunger, the tapering seat $r$ provided beneath the plunger, and the screw $r'$ for adjusting said seat in position to raise or lower said plunger, substantially as described.

8. In a magnet forming machine, the combination with the rollers provided with eccentrically mounted adjustable journals, of the bar $n^4$ fitting the end of said journal and provided with the arc shaped slot and a bolt passing therethrough to secure the same in position, substantially as described.

9. In a magnet forming machine, the combination with the main shaft of the reciprocating slide $e'$ eccentrically driven by said shaft and carrying cutting-off tool $h$ and support $k$, stationary cutting-off tool $m$, cam $a'$ mounted upon the main shaft, cross-head carrying roller $b'$ and plunger $b^5$ and resiliently connected with stationary part of machine by spring $c^3$, and adjustable rollers $n\ n$, substantially as described.

In witness whereof I hereunto subscribe my name this 26th day of December, A. D. 1893.

ORLANDO P. BRIGGS.

Witnesses:
W. CLYDE JONES,
HARRIET G. TEMPLETON.